United States Patent
Hong et al.

(10) Patent No.: US 9,953,229 B2
(45) Date of Patent: Apr. 24, 2018

(54) TRAFFIC LIGHT DETECTION (71) Applicants: Chuyang Hong, Shanghai (CN); Yankun Zhang, Shanghai (CN); Ruyi Jiang, Shanghai (CN); Yun Zhou, Shanghai (CN)

(72) Inventors: Chuyang Hong, Shanghai (CN); Yankun Zhang, Shanghai (CN); Ruyi Jiang, Shanghai (CN); Yun Zhou, Shanghai (CN)

(73) Assignee: Harman International Industries, Incorporated, Stamford, CT (US)

(*) Notice: Subject to any disclaimer, the term of this patent is extended or adjusted under 35 U.S.C. 154(b) by 77 days.

(21) Appl. No.: 14/901,651

(22) PCT Filed: Aug. 20, 2013

(86) PCT No.: PCT/CN2013/081842
§ 371 (c)(1),
(2) Date: Dec. 28, 2015

(87) PCT Pub. No.: WO2015/024180
PCT Pub. Date: Feb. 26, 2015

(65) Prior Publication Data
US 2016/0148063 A1    May 26, 2016

(51) Int. Cl.
G06K 9/00    (2006.01)
G06K 9/62    (2006.01)
(Continued)

(52) U.S. Cl.
CPC ..... *G06K 9/00825* (2013.01); *G06K 9/00818* (2013.01); *G06K 9/3241* (2013.01);
(Continued)

(58) Field of Classification Search
None
See application file for complete search history.

(56) References Cited

U.S. PATENT DOCUMENTS

| | | | | |
|---|---|---|---|---|
| 2010/0100268 A1* | 4/2010 | Zhang | | B60W 30/09 |
| | | | | 701/25 |
| 2010/0262336 A1* | 10/2010 | Rivas | | B60H 1/00735 |
| | | | | 701/36 |
| 2015/0294167 A1* | 10/2015 | Zhang | | G06K 9/00825 |
| | | | | 382/103 |

FOREIGN PATENT DOCUMENTS

| CN | 102176287 A | 9/2011 |
|---|---|---|
| CN | 102354457 A | 2/2012 |

(Continued)

OTHER PUBLICATIONS

Siogkas et al. "Traffic Lights Detection in Adverse Conditions using Color Symmetry and Spatiotemporal Information," Proceedings of VISAPP, 2012.*

(Continued)

*Primary Examiner* — Vikkram Bali
*Assistant Examiner* — Soo Shin
(74) *Attorney, Agent, or Firm* — McCoy Russell LLP (57) ABSTRACT

A method and a system for traffic light detection are provided. The method may include: obtaining a color image; calculating pixel response values for pixels of the color image, respectively, where each of the pixel response values may be calculated using R, G, and B values of a corresponding pixel directly, such that pixel response values of red traffic light pixels are substantially distributed on a first side of a predetermined range and pixel response values of green traffic light pixels are substantially distributed on a second side of the predetermined range which is opposite to the first side; identifying pixels whose pixel response values are distributed on the first side or the second side as candidate pixels; identifying candidate blobs based on the candidate pixels; and verifying whether the candidate blobs are traffic lights. Efficiency and reliability may be improved.

18 Claims, 9 Drawing Sheets (51) Int. Cl.
*G06K 9/46* (2006.01)
*G06K 9/32* (2006.01)
*G08G 1/0962* (2006.01)
*G06T 7/90* (2017.01)

(52) U.S. Cl.
CPC ......... *G06K 9/4647* (2013.01); *G06K 9/6267* (2013.01); *G06T 7/90* (2017.01); *G08G 1/09623* (2013.01); *G06T 2207/10024* (2013.01); *G06T 2207/30252* (2013.01)

(56) References Cited

FOREIGN PATENT DOCUMENTS

| | | |
|---|---|---|
| JP | 2007072948 A | 3/2007 |
| JP | 2011216051 A | 10/2011 |
| KR | 1020090055848 A | 6/2009 |
| KR | 101237374 B1 | 2/2013 |

OTHER PUBLICATIONS

Lindahl "Study of Local Binary Patterns," Master's Thesis, Master's thesis, Linköpings Tekniska Högskola, 2007.*
Diaz-Cabrera et al. "Suspended Traffic Lights Detection and Distance Estimation Using Color Features," IEEE Conferences on Intelligent Transportation Systems, 2012.*
Yu et al. "Traffic Light Detection During Day and Night Conditions by a Camera," ICSP Proceedings, 2010.*
Omachi, M. et al., "Detection of Traffic Light Using Structural Information," IEEE 10th International Conference on Signal Processing (ICSP2010), Oct. 24, 2010, 4 pages.
Diaz-Cabrera, M. et al., "Suspended Traffic Lights Detection and Distance Estimation Using Color Features," 15th International IEEE Conference on Intelligent Transportation Systems (ITSC2012), Sep. 16, 2012, 6 pages.
ISA State Intellectual Property Office of the People's Republic of China, International Search Report and Written Opinion Issued in Application No. PCT/CN2013/081842, dated Jun. 9, 2014, WIPO, 13 pages.

* cited by examiner

TRAFFIC LIGHT DETECTION

CROSS REFERENCE TO RELATED APPLICATIONS

The present application is a U.S. National Phase of International Patent Application Serial No. PCT/CN2013/081842, entitled "TRAFFIC LIGHT DETECTION," filed on Aug. 20, 2013, the entire contents of which are hereby incorporated by reference for all purposes.

TECHNICAL FIELD

The present disclosure generally relates to traffic light detection.

BACKGROUND

Traffic light detection is more and more widely used in driving assistance systems. In some conventional methods, traffic lights are detected based on color segmentation and template matching.

SUMMARY

According to one embodiment, a method for traffic light detection is provided. The method may include: obtaining a color image; calculating pixel response values for pixels of the color image, respectively, where each of the pixel response values may be calculated using R, G, and B values of a corresponding pixel directly, such that pixel response values of red traffic light pixels are substantially distributed on a first side of a predetermined range and pixel response values of green traffic light pixels are substantially distributed on a second side of the predetermined range which is opposite to the first side; identifying pixels whose pixel response values are distributed on the first side or the second side as candidate pixels; identifying candidate blobs based on the candidate pixels; and verifying whether the candidate blobs are traffic lights.

In some embodiments, pixel response values of pixels other than red traffic light pixels and green traffic light pixels are substantially distributed within the predetermined range.

In some embodiments, each of the pixel response values may be calculated based on multiplication of a first component and a second component of a corresponding pixel, where the first component may indicate a tendency of the pixel response value, and the second component may be able to amply the tendency if the tendency is towards the first side or the second side.

In some embodiments, the first component may be calculated based on summation of a third, a fourth, and a fifth components which are respectively based on R, G and B values of the corresponding pixel, where the third component may have a first sign, and the fourth and fifth components may have a second sign which is opposite to the first sign.

In some embodiments, the third component may be $k_1*R$, the fourth component may be $-k_2*G$; and the fifth component may be $-k_3*B$, where $k_1$, $k_2$ and $k_3$ are set such that the tendency is substantially towards the first side if the corresponding pixel is a red traffic light pixel and the tendency is substantially towards the second side if the corresponding pixel is a green traffic light pixel.

In some embodiments, the second component may be calculated based on summation of a sixth and a seventh components which are respectively based on R and G values of the corresponding pixel, where the sixth and the seventh components have the same sign.

In some embodiments, the sixth component may be $k_4*R$ and the seventh component may be $k_5*G$, where $k_4$ and $k_5$ are set such that the pixel response value is substantially on the first side if the corresponding pixel is a red traffic light pixel, and the pixel response value is substantially on the second side if the corresponding pixel is a green traffic light pixel.

In some embodiments, the first component may be $$\left(R - \frac{G+B}{2}\right).$$

Therefore, based on whether the first component is positive or negative, whether the pixel is more likely to be a red traffic light pixel or a green traffic light pixel may be conveniently determined. Further, the larger the absolute value of the first component is, the more possible the pixel could be a traffic light pixel.

In some embodiments, identifying the candidate blobs may include: identifying a first set of blobs based on the candidate pixels; and identifying the candidate blobs from the first set of blobs, where each of the first set of blobs may be determined whether or not a member of the candidate blobs based on pixel response values of its pixels and its surrounding pixels, such that false positives may be further reduced.

In some embodiments, the first set of blobs may be identified using connected component labeling.

In some embodiments, the candidate blobs may be identified based on possibility values of the blobs of the first set, where each probability value may be calculated by: defining an ego segment for a corresponding blob of the first set of blobs, which ego segment may substantially encompass the corresponding blob; calculating an ego segment response value based on pixel response values of pixels within the ego segment; defining a predetermined number of ambient segments each of which partly overlaps the ego segment; calculating an ambient segment response value for each of the ambient segments, where each ambient segment response value may be calculated based on pixel response values of pixels within a corresponding ambient segment; and calculating the probability value based on the ego segment response value and the predetermined number of ambient segment response values.

In some embodiments, each of the ambient segments may have the same size and shape as the ego segment.

In some embodiments, the probability value of the corresponding blob may be calculated based on the following Equation:

$$pv = \sum_{k=1}^{n} |\eta - \eta_k|$$

where pv stands for the probability value of the corresponding blob, $\eta$ stands for the ego segment response value, $\eta_k$ stands for the ambient segment response value of a $k^{th}$ ambient segment and n is the predetermined number.

In some embodiments, identifying the candidate blobs may further include: identifying a second set of blobs from the first set of blobs, where the candidate blobs are identified from the second set of blobs, where each of the first set of blobs may be determined whether or not a member of the second set of blob based on its corresponding ego segment response value and pixel response values of its pixels. In some embodiments, if the ego segment response value of a blob of the first set is on the same side of the predetermined range as pixel response values of pixels within the blob, the blob may be determined a member of the second set of blobs. False positives may be further reduced. Besides, following computations, including defining ambient segments, calculating ambient segment response values, calculating probability values, etc, for these false positives may be avoided, which may improve the efficiency.

In some embodiments, the method may further include: identifying a third set of blobs from the first set of blobs based on at least one geometric parameter, where the second set of blobs may be identified from the third set of blobs.

In some embodiments, the at least one geometric parameter may include a size parameter. As a result, blobs in the first set of blobs with too large sizes, which are not likely to be a traffic light, may be filtered out.

In some embodiments, the at least one geometric parameter may include a shape parameter. As a result, blobs in the first set of blobs which are not likely to have a round shape may be filtered out.

In some embodiments, verifying whether the candidate blobs are traffic lights may include: verifying the candidate blobs with a cascade detector to obtain first verified regions; and verifying the first verified regions with a support vector machine (SVM). If a candidate blob passes both the verifications of the cascade detector and the SVM, a traffic light may be detected in the region.

According to one embodiment, a system for traffic light detection is provided. The system may include a processing device configured to: obtain a color image; calculate pixel response values for pixels of the color image, respectively, where each of the pixel response values may be calculated using R, G, and B values of a corresponding pixel directly, such that pixel response values of red traffic light pixels are substantially distributed on a first side of a predetermined range and pixel response values of green traffic light pixels are substantially distributed on a second side of the predetermined range which is opposite to the first side; identify pixels whose pixel response values are distributed on the first side or the second side as candidate pixels; identify candidate blobs based on the candidate pixels; and verify whether the candidate blobs are traffic lights.

In some embodiments, pixel response values of pixels other than red traffic light pixels and green traffic light pixels are substantially distributed within the predetermined range based on the calculation.

In some embodiments, the processing device may be configured to calculate each of the pixel response values based on multiplication of a first component and a second component of a corresponding pixel, where the first component may indicate a tendency of the pixel response value, and the second component may be able to amplify the tendency if the tendency is towards the first side or the second side.

In some embodiments, the first component may be calculated based on summation of a third, a fourth, and a fifth components which are respectively based on R, G and B values of the corresponding pixel, where the third component may have a first sign, and the fourth and fifth components may have a second sign which is opposite to the first sign.

In some embodiments, the third component may be $k_1*R$, the fourth component may be $-k_2*G$; and the fifth component may be $-k_3*B$, where $k_1$, $k_2$ and $k_3$ are set such that the tendency is substantially towards the first side if the corresponding pixel is a red traffic light pixel and the tendency is substantially towards the second side if the corresponding pixel is a green traffic light pixel.

In some embodiments, the second component may be calculated based on summation of a sixth and a seventh components which are respectively based on R and G values of the corresponding pixel, where the sixth and the seventh components have the same sign.

In some embodiments, the sixth component may be $k_4*R$ and the seventh component may be $k_5*G$, where $k_4$ and $k_5$ are set such that the pixel response value is substantially on the first side if the corresponding pixel is a red traffic light pixel, and the pixel response value is substantially on the second side if the corresponding pixel is a green traffic light pixel.

In some embodiments, the first component may be $$\left(R - \frac{G+B}{2}\right).$$

In some embodiments, the processing device may be configured to: identify a first set of blobs based on the candidate pixels; and identify the candidate blobs from the first set of blobs, where each of the first set of blobs may be determined whether or not a member of the candidate blobs based on pixel response values of its pixels and its surrounding pixels.

In some embodiments, the processing device may be configured to identify the first set of blobs using connected component labeling.

In some embodiments, the processing device may be configured to identify the candidate blobs from the first set of blobs based on possibility values of the blobs of the first set, where each possibility value may be calculated by: defining an ego segment for a corresponding blob of the first set of blobs, which ego segment may substantially encompass the corresponding blob; calculating an ego segment response value based on pixel response values of pixels within the ego segment; defining a predetermined number of ambient segments each of which partly overlaps the ego segment; calculating an ambient segment response value for each of the ambient segments, where each ambient segment response value may be calculated based on pixel response values of pixels within a corresponding ambient segment; and calculating the probability value based on the ego segment response value and the predetermined number of ambient segment response values.

In some embodiments, each of the ambient segments may have the same size and shape as the ego segment.

In some embodiments, the probability value of the corresponding blob may be calculated based on the following Equation:

$$pv = \sum_{k=1}^{n} |\eta - \eta_k|$$

where pv stands for the probability value of the corresponding blob, $\eta$ stands for the ego segment response value, $\eta_k$ stands for the ambient segment response value of a $k^{th}$ ambient segment and n is the predetermined number.

In some embodiments, the processing device may be further configured to: identify a second set of blobs from the first set of blobs, where the candidate blobs are identified from the second set of blobs, where each of the first set of blobs may be determined whether or not a member of the second set of blob based on its corresponding ego segment response value and pixel response values of its pixels. In some embodiments, if the ego segment response value of a blob of the first set is on the same side of the predetermined range as pixel response values of pixels within the blob, the blob may be determined a member of the second set of blobs.

In some embodiments, the processing device may be further configured to: identify a third set of blobs from the first set of blobs based on at least one geometric parameter, where the second set of blobs may be identified from the third set of blobs.

In some embodiments, the at least one geometric parameter may be a size parameter.

In some embodiments, the at least one geometric parameter may be a shape parameter.

In some embodiments, the processing device may be configured to verify whether the candidate blobs are traffic lights by: verifying the candidate blobs with a cascade detector to obtain first verified regions, and verifying the first verified regions with a support vector machine (SVM).

According to one embodiment, a system for traffic light detection is provided. The system may include: means for calculating pixel response values for pixels of a color image, respectively, where each of the pixel response values may be calculated using R, G, and B values of a corresponding pixel directly, such that pixel response values of red traffic light pixels are substantially distributed on a first side of a predetermined range and pixel response values of green traffic light pixels are substantially distributed on a second side of the predetermined range which is opposite to the first side; means for identifying pixels whose pixel response values are distributed on the first side or the second side as candidate pixels; means for identifying candidate blobs based on the candidate pixels; and means for verifying whether the candidate blobs are traffic lights.

According to one embodiment, a non-transitory computer readable medium, which contains a computer program for traffic light detection, is provided. When the computer program is executed by a processor, it will instruct the processor to: calculate pixel response values for pixels of a color image, respectively, where each of the pixel response values may be calculated using R, G, and B values of a corresponding pixel directly, such that pixel response values of red traffic light pixels are substantially distributed on a first side of a predetermined range and pixel response values of green traffic light pixels are substantially distributed on a second side of the predetermined range which is opposite to the first side; identify pixels whose pixel response values are distributed on the first side or the second side as candidate pixels; identify candidate blobs based on the candidate pixels; and verify whether the candidate blobs are traffic lights.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Traffic light detection may be based on image processing technology. Candidates for a traffic light on an image may need to be verified whether or not a true traffic light. Normally, such verification may be implemented using a traffic light classifier, such as a cascade detector or a support vector machine, which may lead a large computation load. Therefore, to improve efficiency and reliability of traffic light detection, before the verification, segments in the color image which are not likely to be a traffic light need to be filtered out as many as possible, meanwhile, it should be ensured that segments in the color image which are likely to be a traffic light may not be filtered out. A balance between efficiency and reliability is a major concern in traffic light detection.

Figure 1:
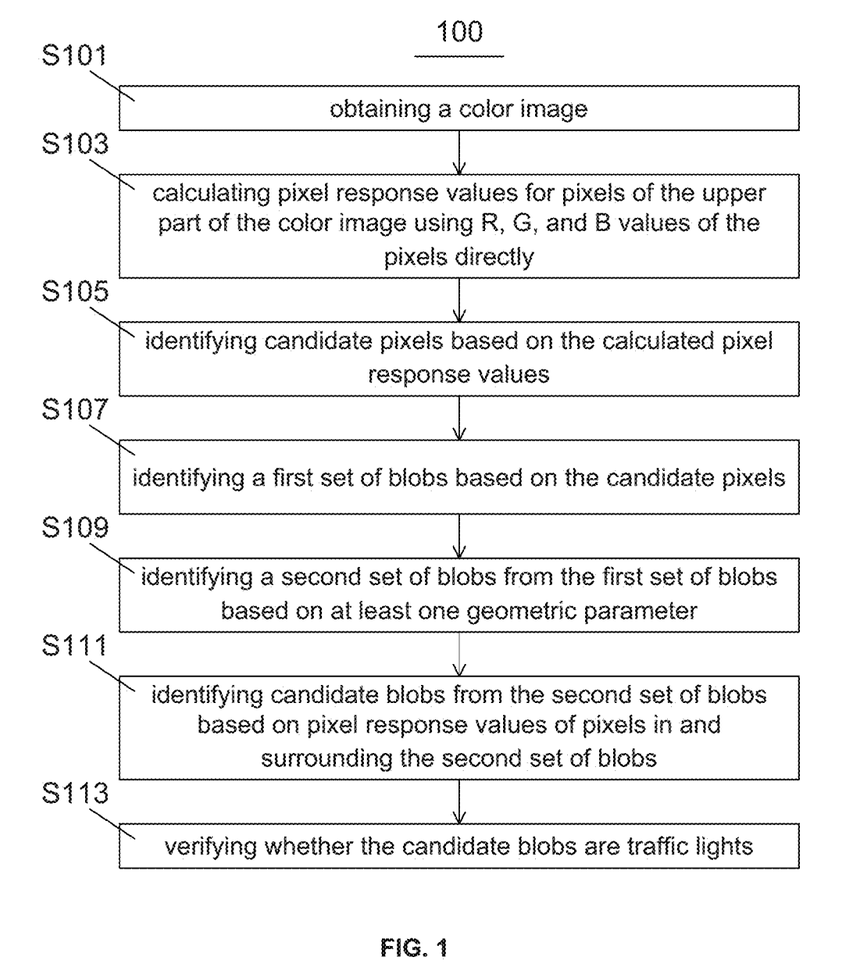
FIG. 1 schematically illustrates a flow chart of a method for traffic light detection according to one embodiment.

FIG. 1 schematically illustrates a flow chart of a method 100 for traffic light detection according to one embodiment.

Referring to FIG. 1, in S101, obtaining a color image.

In some embodiments, the color image may be captured by a camera. In some embodiments, the camera may be mounted on a vehicle. In some embodiments, color images may be captured at evenly spaced time points, and may be processed one by one successively.

Figure 2:
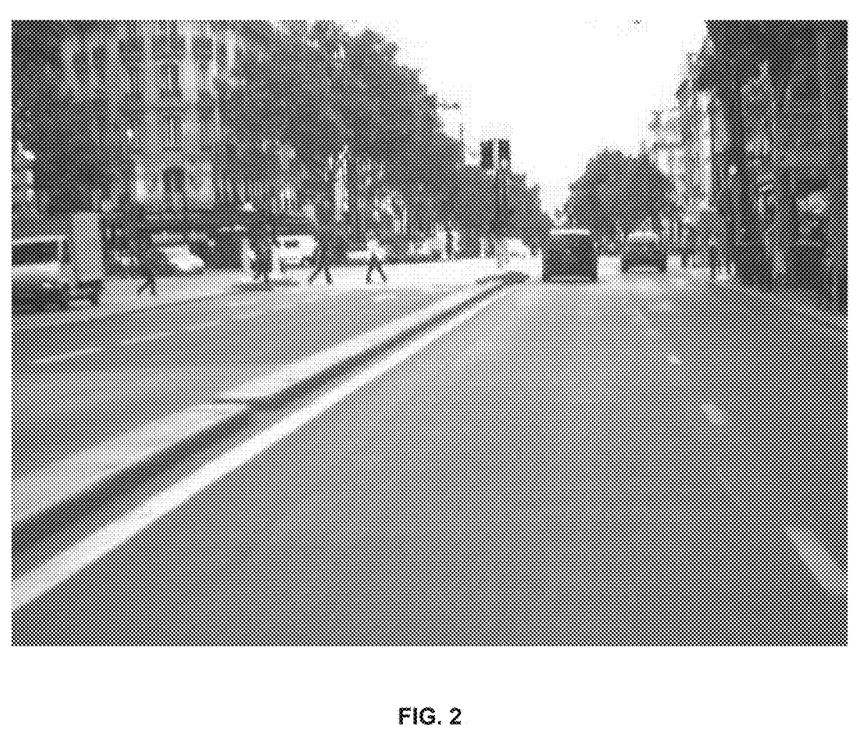
FIG. 2 illustrates an example image captured by a camera mounted on a vehicle.

FIG. 2 illustrates an example image captured by a camera mounted on a vehicle. The image is captured at an intersection. It could be seen from the image that, many objects may have a color close to a traffic light at the intersection, such as trees, vehicle taillights, billboard lights, red or green logos, which may be false positives after verification by a conventional traffic light classifier. These false positives may need to be filtered out as many as possible.

Figure 3:
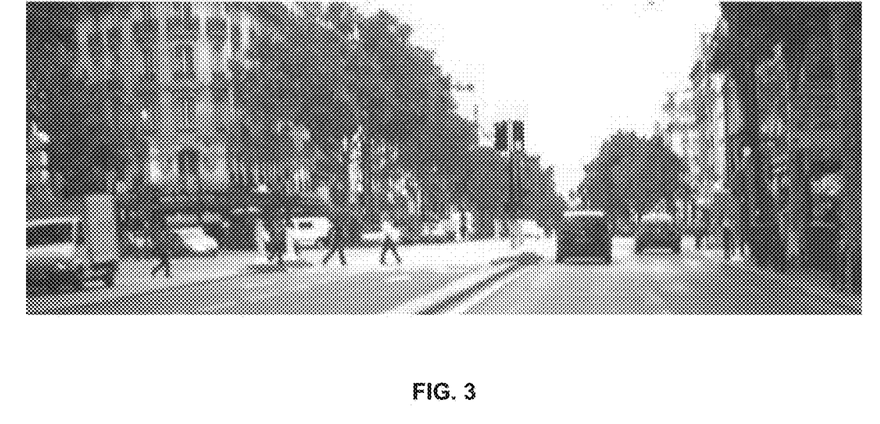
FIG. 3 illustrates an upper part of the image of FIG. 2.

In some embodiment, a lower part of the image may be removed to improve the efficiency, since generally a traffic light may not appear in the lower part. As a result, the rest upper part of the image is remained for subsequent processing. FIG. 3 illustrates an upper part of the color image of FIG. 2. It should be noted that removing the low part of the image may be optional.

In S103, calculating pixel response values for pixels of the upper part of the color image using R, G, and B values of the pixels directly.

Based on the calculation, pixel response values of pixels other than the red traffic light pixels and green traffic light pixels may be substantially distributed in a predetermined range, pixel response values of the red traffic light pixels may be substantially distributed on a first side of the predetermined range, and pixel response values of the green traffic light pixels may be substantially distributed on a second side of the predetermined range, where the second side is opposite to the first side.

In some embodiments, each of the pixel response values may be calculated based on two components of a corresponding pixel, where a first component may indicate a tendency that whether the corresponding pixel is more like a green traffic light pixel, a red traffic light pixel or a pixel other than a traffic light, i.e., a tendency towards the first side, the second side or the predetermined range; and the second component may be able to amplify the tendency if the tendency is substantially towards the first side or the second side. In some embodiments, the pixel response value may calculated based on multiplication of the first and second components.

Normally, traffic light pixels, either red or green, should be outstanding in certain color channel values, compared with other objects. For example, a red traffic light pixel may have a relatively high red channel (R) value, but very low green channel (G) value and blue channel (B) value; while a green traffic light pixel may have relatively high G value and B value, but very low R value. Pixels other than a traffic light pixel may have R, G and B values closer with each other. Therefore, R, G and B values may be used to separate red traffic light pixels, green traffic light pixels and pixels of other objects apart, thus can be used to calculate the first component.

In some embodiments, the first component may be calculated based on summation of a third, a fourth, and a fifth components which are respectively based on R, G and B values of the corresponding pixel, where the third component may have a first sign, and the fourth and fifth components may have a second sign which is opposite to the first sign. As a result, the first components of a red traffic light pixel and a green traffic light pixel may be towards opposite sides.

In some embodiments, the third component may be $k_1*R$, the fourth component may be $-k_2*G$; and the fifth component may be $-k_3*B$, where $k_1$, $k_2$ and $k_3$ are set such that the tendency is substantially towards the first side if the corresponding pixel is a red traffic light pixel and the tendency is substantially towards the second side if the corresponding pixel is a green traffic light pixel. The weight factors $k_1$, $k_2$ and $k_3$ may be adjusted based on ambient lights, camera parameters, etc.

In some embodiments, the first component may be $$\left(R - \frac{G+B}{2}\right).$$

Therefore, based on whether the first component is positive or negative, whether the pixel is more likely to be a red traffic light pixel or a green traffic light pixel may be conveniently determined. Further, the larger the absolute value of the first component is, the more possible the pixel could be a traffic light pixel.

The second component may be used to amplify the disparity between pixel response values of the red traffic light pixels and pixel response values of the green traffic light pixels. The method may be more robust if this disparity is enlarged. Normally the traffic light pixels, either red or green, may not only be pure in a traffic light color, but also have relatively high luminosity. Therefore, in some embodiments, the second component may represent the luminosity of the corresponding pixel, which is a suitable way to amplify the tendency. As a result, objects which are red or green, but dark, such as tree leaves, may be filtered out. As well known in the art, the luminosity of the pixel may be highly relevant to the R, G and B values. Therefore, the second component may also be represented using the R, G and B values.

In some embodiments, the second component may be calculated based on summation of a sixth and a seventh components which are respectively based on R and G values of the corresponding pixel, where the sixth and the seventh components have the same sign.

In some embodiments, the sixth component may be $k_4*R$ and the seventh component may be $k_5*G$, where $k_4$ and $k_5$ are set such that the pixel response value is substantially on the first side if the corresponding pixel is a red traffic light pixel, and the pixel response value is substantially on the second side if the corresponding pixel is a green traffic light pixel.

In an example, the pixel response value of the corresponding pixel was calculated based on the following Equation (1):

$$pr = \left(R - \frac{G+B}{2}\right)*(R+G), \quad (1)$$

where pr represents the pixel response value, R, G and B respectively represent R, G and B values of the corresponding pixel.

Figure 4:
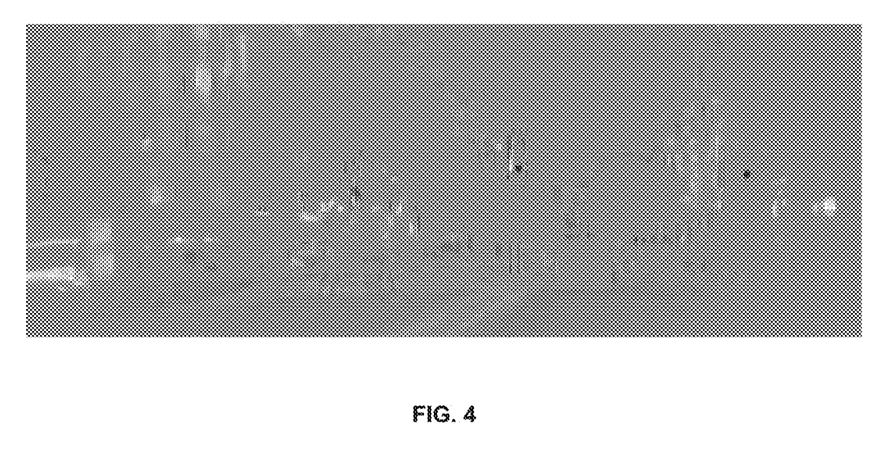
FIG. 4 schematically illustrates pixel response values of pixels in FIG. 3.

Based on Equation (1), it could be concluded that pixel response values of the red traffic light pixels may be positively larger, pixel response values of the green traffic light pixels may be negatively larger, and pixel response values of objects other than the traffic lights may have relatively small absolute values. FIG. 4 schematically illustrates pixel response values of pixels in FIG. 3 calculated based on Equation (1). In FIG. 4, the pixel response values are converted into grayscales. It could be seen from FIG. 4 that the red traffic light pixels are relatively light while the green traffic light pixels are relatively dark. It should be noted that FIG. 4 is merely for illustration. In a practical process, there is no need to form an image for illustrating the pixel response values.

In S105, identifying candidate pixels based on the calculated pixel response values.

The pixel response values of the red traffic light pixels, the pixel response values of the green traffic light pixels and the pixel response values of other pixels may be distributed into separated ranges. Therefore, candidate pixels for a red traffic light or a green traffic light may be identified based on the pixel response values.

In an example, the pixel response values were calculated based on Equation (1) and were normalized to [0, 1]. In the example, pixels having a pixel response value within a predetermined range from −0.25 to 0.375 were identified as pixels other than a traffic light, pixels having a pixel response value at a first side of the predetermined range, i.e., larger than 0.375 were identified as red traffic light candidate pixels, and pixels having a pixel response value at a second side of the predetermined range, i.e., less than −0.25, were identified as green traffic light candidate pixels. The specific range is merely an example and can be adjusted based on camera parameters, etc.

Figure 5:
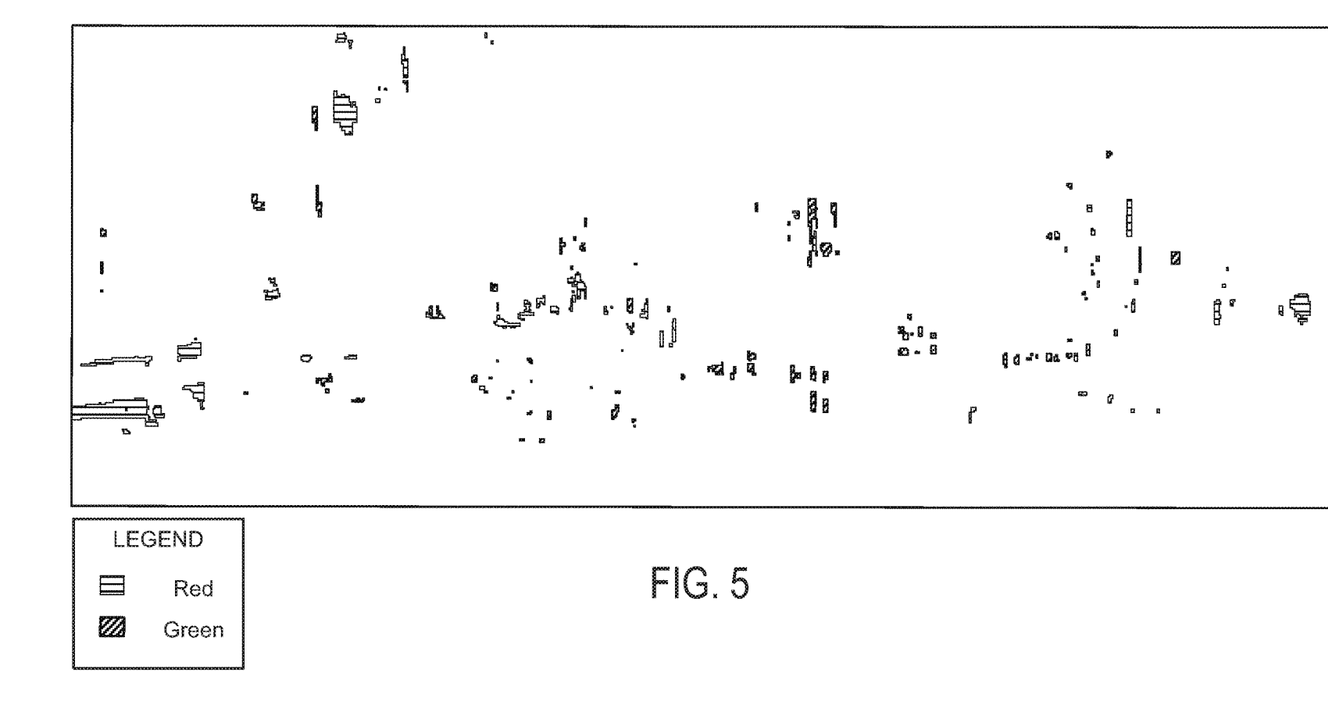
FIG. 5 schematically illustrates candidate pixels in the image of FIG. 3.

FIG. 5 schematically illustrates candidate pixels in the image of FIG. 3. As shown in FIG. 5, the red traffic light candidate pixels and the green traffic light candidate pixels are marked by horizontal and diagonal hatching respectively. It should be noted that FIG. 5 is given for illustration only. In practical processing, it is not necessary to obtain an image like FIG. 5 to visibly show the candidate pixels.

In S107, identifying a first set of blobs based on the candidate pixels.

In some embodiments, the first set of blobs may be identified using connected component labeling. The first set of blobs may include blobs identified based on the red traffic light candidate pixels which are to be subject to red traffic light detection, and blobs identified based on the green traffic light candidate pixels which are to be subject to green traffic light detection. Following processes for red traffic light detection and green traffic light detection can be performed either in parallel or in serial. Hereunder, the red traffic light detection and green traffic light detection are performed in parallel as an example.

It should be noted that the first set of blobs may be taken as candidate blobs to be verified using a traffic light detector or classifier. However, in some embodiments, false positives in the first set of blobs may be further filtered out, so that the verifications of the candidate blobs, which normally take the most computation resource, may be reduced. Hereunder gives an example for further filtering out false positives.

In S109, identifying a second set of blobs from the first set of blobs based on at least one geometric parameter.

To reduce computation load, blob analysis based on at least one geometric parameter may be used to filter out some blobs which are not likely to be a traffic light based on their shapes and/or sizes. Correspondingly, the remaining blobs may be identified as the second set of blobs.

Figure 6:
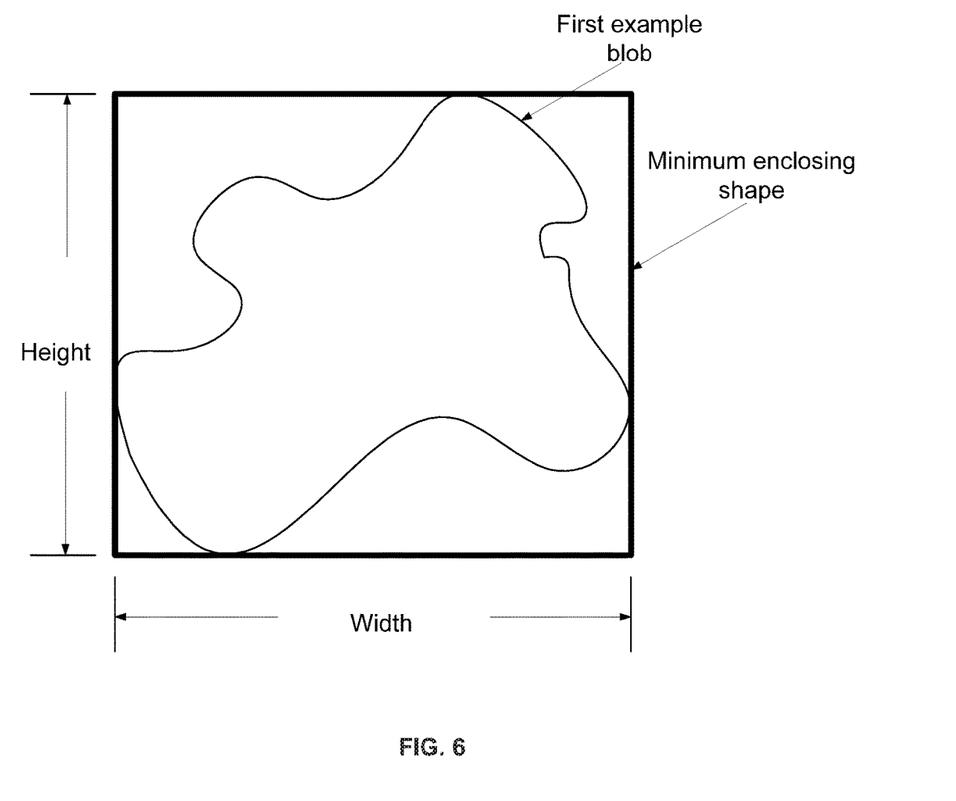
FIG. 6 schematically illustrates a first example blob of a first set of blobs and its minimum enclosing shape.

Minimum enclosing shapes respectively encompassing blobs of the first set may be defined in the blob analysis for facilitating analyzing. FIG. 6 schematically illustrates a first example blob of the first set of blobs and its minimum enclosing shape. In some embodiment, the minimum enclosing shapes may be rectangles.

In some embodiments, the at least one geometric parameter may be a pixel number. For example, if the first example blob has a pixel number lager than 255, it may be filtered out because a traffic light should not be too large. It should be noted that specific value of the criterion may be altered based on factors like image resolution. When the image resolution is 720*480, the above proposed number 255 may be suitable. A suitable value of this criterion may increase or decrease with the increase or decrease of the image resolution.

In some embodiments, the at least one geometric parameter may be the width or height of the blob. In some embodiments, a width and a height of the minimum enclosing shape may be taken as the width and height of the first example blob, and if the first example blob has a width or height larger than 24, it may be filtered out. It should be noted that the value of the width or height criterion may also change with the image resolution.

In some embodiments, the at least one geometric parameter may be a width to height ratio. Since normally a traffic light should be round, its corresponding blob may have a minimum enclosing rectangle close to a square. For example, if the first example blob has a width to height ratio beyond a range from about 0.5 to 2, it may be filtered out.

The above described geometric parameters may be used individually or together as criteria for the blob analysis. It should be noted that, the above described numerical values are merely examples and may be adjusted according to specific scenarios and/or camera parameters.

In S111, identifying candidate blobs from the second set of blobs based on pixel response values of pixels in and surrounding the second set of blobs.

Each of the blobs of the second set may be determined whether or not a member of the candidate blobs base on pixel response values of its pixels and surroundings. False positives may be reduced, because normally a traffic light should not only be bright and pure in the traffic light color itself, but also be prominent among its local surroundings, which means the traffic light blob may have be outstanding in pixel response values.

Figure 7:
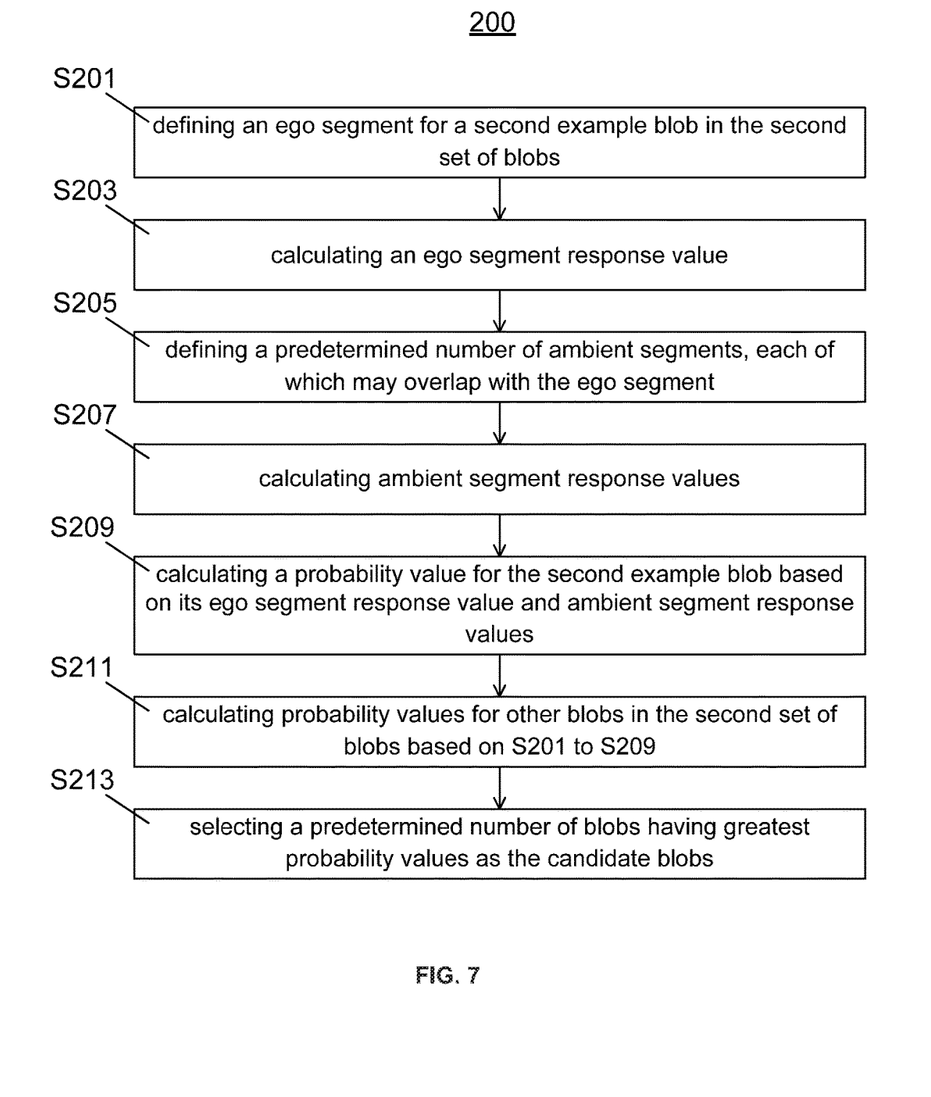
FIG. 7 schematically illustrates a process for identifying candidate blobs from a second set of blobs according to one embodiment.

FIG. 7 schematically illustrates a flow chart of a process 200 for identifying the candidate blobs from the second set of blobs according to one embodiment.

Referring to FIG. 7, in S201, defining an ego segment for a second example blob in the second set of blobs.

The ego segment may substantially encompass the second example blob. In some embodiments, the ego segment may be a minimum enclosing rectangle of the second example blob.

In some embodiments, minimum enclosing rectangles were defined during the blob analysis in S109, so S201 may be avoided.

In S203, calculating an ego segment response value.

The ego segment response value may be calculated based on summation of pixel response values of pixels in the ego segment. In some embodiments, the ego blob response may be calculated based on Equation (2):

$$\eta = \sum_{y_m \leq y < y_n} \sum_{x_i \leq x < x_j} pr(x, y) \qquad (2)$$

where η stands for the ego segment response value, pr(x,y) stands for the pixel response value of a pixel in ego segment having an image coordinate (x,y), $y_m$ and $y_n$ stand for upmost and lowest coordinates of the ego segment on a y axis, respectively, and $x_i$ and $x_j$ stand for leftmost and rightmost coordinates of the ego segment on a x axis, respectively.

In some embodiments, after the calculation of the ego segment response value, whether the second example blob is a false positive may be determined. Specifically, if the ego segment response value and the pixel response values of pixels in the second example blob are not on the same side of the predetermined range, the second example blob may be filtered out. Therefore, false positives may be further filtered out, especially for some objects like red and/or green characters, logos, and the like, which may have extreme pixel response values and hardly be filtered out in the blob analysis. Besides, following computations for these false positives may be avoided.

In S205, defining a predetermined number of ambient segments, each of which may overlap with the ego segment.

There are various ways to define the ambient segments. In some embodiments, each of the ambient segments may have a same shape and size with the ego segment.

Figure 8:
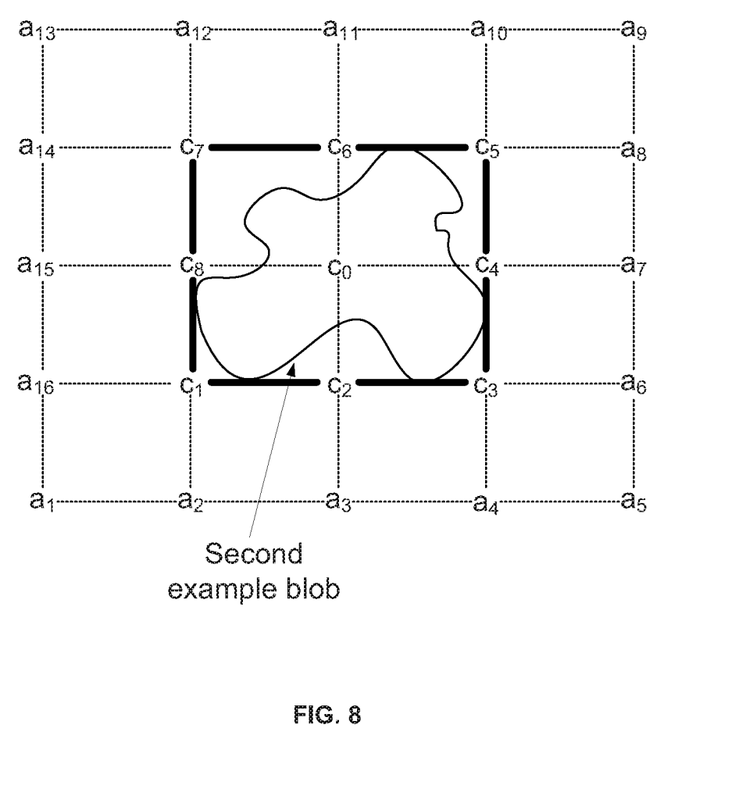
FIG. 8 schematically illustrates a second example blob of a second set of blobs and its ego segment and ambient segments.

FIG. 8 schematically illustrates the second example blob and an example of its ego segment and ambient segments. As shown in FIG. 8, a minimum enclosing rectangle (windowed with heavy lines) which is defined as the ego segment of the second example blob. Eight rectangles having a same shape and size as the minimum enclosing rectangle are defined as the ambient segments. Specifically, $c_0$ to $c_8$ are center points of the ego segment and the ambient segments. The eight ambient segments are $a_1 a_3 c_0 a_{15}$, $a_2 a_4 c_4 c_8$, $a_3 a_5 a_7 c_0$, $c_2 a_6 a_8 c_6$, $c_0 a_7 a_9 a_{11}$, $c_8 c_4 a_{10} a_{12}$, $a_{15} c_0 a_{11} a_{13}$, and $a_{16} c_2 c_6 a_{14}$.

In S207, calculating ambient segment response values.

Each of the ambient segment response values may be calculated based on pixel response values of pixels in a corresponding ambient segment. For example, summation of the pixel response values may be calculated.

In some embodiments, whether the second example blob is a false positive may be determined based on its ego segment response value and ambient segment response value. For example, if the pixel response values were calculated based on the above Equation (1), the ego segment response value of the second example blob should be larger than any of its ambient segment response values if its pixels are red traffic light pixels, vice versa, or else, the second example blob may be filtered out.

In S209, calculating a probability value for the second example blob based on its ego segment response value and ambient segment response values.

In some embodiments, the probability value of the second example blob may be calculated based on Equation (3):

$$pv = \sum_{k=1}^{n} |\eta - \eta_k|, \quad (3)$$

where pv stands for the probability value of the corresponding blob, $\eta$ stands for the ego segment response value, $\eta_k$ stands for the ambient segment response value of a $k^{th}$ ambient blob and n is the predetermined number.

It could be concluded that, the larger the probability value is, the more likely the second example blob represents a traffic light.

In S211, calculating probability values for other blobs in the second set of blobs based on S201 to S209.

In S213, selecting a predetermined number of blobs having greatest probability values as the candidate blobs.

In some embodiments, the blobs for red traffic light and green traffic light are respectively sorted decreasingly based on the probability values, where top 20 blobs for red traffic light and top 30 blobs for green traffic light are selected as the candidate blobs.

In such ways, a relatively small number of blobs may be selected as the candidate blobs. False positives may be reduced and processing speed may be increased.

Referring back to FIG. 1, in S113, verifying whether the candidate blobs are traffic lights.

Using a traffic light detector or classifier such as template matching, neural network, support vector machine (SVM), cascade detector, and the like, whether a region corresponding to a candidate blob represents a traffic light may be determined. In some embodiments, regions in the color image corresponding to the candidate blobs may be verified. In some embodiments, regions in a grayscale image converted from the color image corresponding to the candidate blobs may be verified. As stated above, based on the above processing, a relatively small number of candidate blobs may be remained, thereby improving both the reliability and efficiency.

Specifically, regions corresponding to the candidate blobs may be segmented in the color image firstly. Segmenting the regions may be implemented based on positions, sizes and types of the candidate blobs, and a traffic light template. In some embodiments, for a vertically arranged traffic light template, the candidate blob for a red traffic light should be located on top of the corresponding region, the candidate blob for a green traffic light should be located on bottom of the corresponding region, and the corresponding region may have a width equaling to or a little larger than that of the blob and a height more than three times of that of the blob. For a horizontally arranged traffic light template, the candidate blob for a red traffic light should be located on left of the corresponding region, the candidate blob for a green traffic light should be located on right of the corresponding region, the corresponding region may have a width at least three times of that of the blob and a height equaling to or a little larger than that of the blob.

In some embodiments, the corresponding regions may be enlarged to ensure that they can cover the traffic light(s) in the color image. For example, a rectangle region corresponding to a candidate blob in the third set of blob may be calculated based on Equation (4):

$$r = 1.2 \max(w, h) + 1 \quad (4),$$

$$\begin{cases} \text{left} = cx - r \\ \text{right} = cx + r \end{cases} \Bigg| \begin{array}{l} \text{red\_light} \begin{cases} \text{top} = cy - r \\ \text{bottom} = cy + 2.33r \end{cases} \\ \text{green\_light} \begin{cases} \text{top} = cy - 2.33r \\ \text{bottom} = cy + r \end{cases} \end{array},$$

where max(w,h) represents a larger value between the candidate blob's width and height measured in pixel number, cx and cy respectively represent x and y coordinates of a center point of the candidate blob, left, right, top and bottom respectively represent four side edges of the rectangle region.

Figure 9:
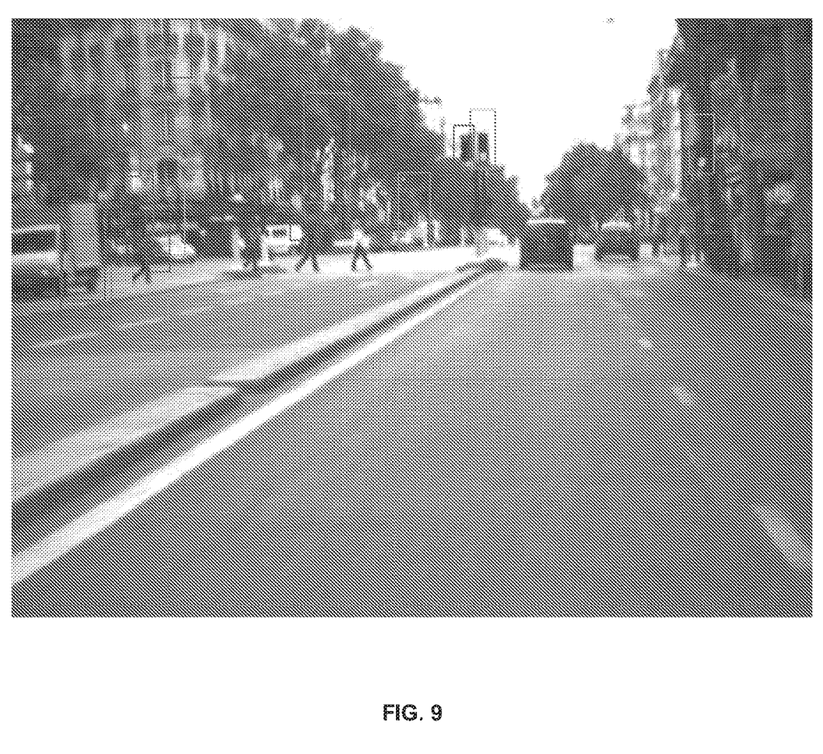
FIG. 9 illustrates rectangle regions in the image of FIG. 2 corresponding to the candidate blobs.
Figure 10:
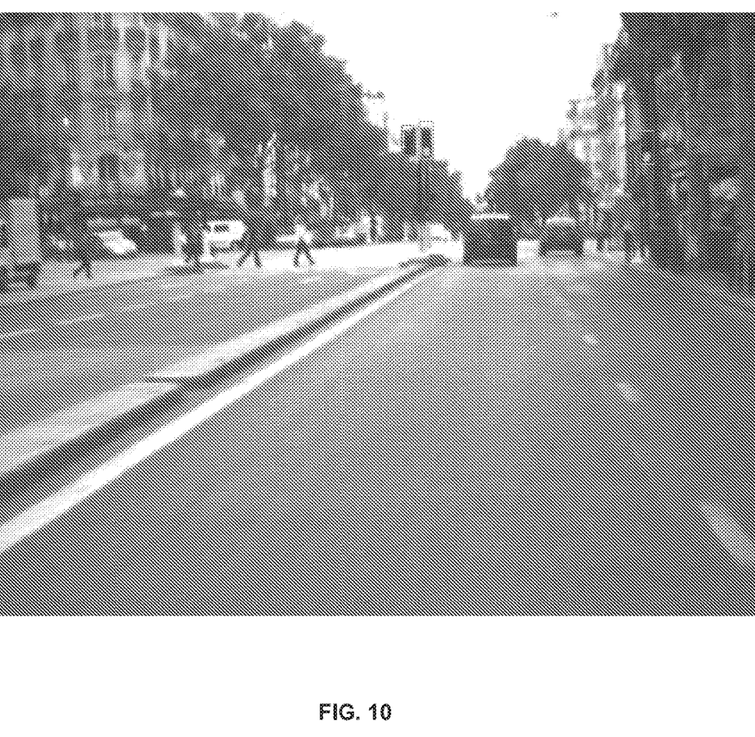
FIG. 10 illustrates traffic lights detected in the image of FIG. 2.

FIG. 9 illustrates rectangle regions in the image of FIG. 2 corresponding to the candidate blobs. The rectangle regions corresponding to the candidate blobs for red and green traffic lights are marked. It could be seen from FIG. 9 that false positives may still exist. Thereafter, these rectangle regions may be verified using a traffic light detector or classifier. In some embodiments, the traffic light detector may include a cascade detector and a SVM. In some embodiments, the cascade detector may be used prior to the SVM, since the SVM takes more time than the cascade detector. In some embodiments, the rectangle regions in the color image may be converted into monochrome images before being verified by the traffic light detector. Based on the verification, whether there is a region in the color image, which region corresponds to one of the candidate blobs, representing a traffic light may be determined and the traffic light may be localized. A result may be output by framing the identified traffic light(s), such as illustrated in FIG. 10.

According to one embodiment, a system for traffic light detection is provided. The system may include a processing device configured to: obtain a color image; calculate pixel response values for pixels of the upper part of the color image using R, G, and B values of the pixels directly; identify candidate pixels based on the calculated pixel response values; identify a first set of blobs based on the candidate pixels; identify a second set of blobs from the first set of blobs based on at least one geometric parameter; identify candidate blobs from the second set of blobs based on pixel response values of pixels in and surrounding the second set of blobs; and verify whether the candidate blobs are traffic lights. Specific configurations of the processing device may be found by referring S101 to S113 above, which may not be illustrated in detail here.

According to one embodiment, a system for traffic light detection is provided. The system may include: means for calculating pixel response values for pixels of a color image, respectively, where each of the pixel response values may be calculated using R, G, and B values of a corresponding pixel directly, such that pixel response values of red traffic light pixels are substantially distributed on a first side of a predetermined range and pixel response values of green traffic light pixels are substantially distributed on a second side of the predetermined range which is opposite to the first side; means for identifying pixels whose pixel response values are distributed on the first side or the second side as candidate pixels; means for identifying candidate blobs based on the candidate pixels; and means for verifying whether the candidate blobs are traffic lights.

According to one embodiment, a non-transitory computer readable medium, which contains a computer program for traffic light detection, is provided. When the computer program is executed by a processor, it will instruct the processor to: calculate pixel response values for pixels of a color image, respectively, where each of the pixel response values may be calculated using R, G, and B values of a corresponding pixel directly, such that pixel response values of red traffic light pixels are substantially distributed on a first side of a predetermined range and pixel response values of green traffic light pixels are substantially distributed on a second side of the predetermined range which is opposite to the first side; identify pixels whose pixel response values are distributed on the first side or the second side as candidate pixels; identify candidate blobs based on the candidate pixels; and verify whether the candidate blobs are traffic lights.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for traffic light detection, comprising:
    obtaining, with a camera, a color image;
    calculating, with a processor, pixel response values for pixels of the color image, respectively, where each of the pixel response values is calculated using R, G, and B values of a corresponding pixel directly, such that pixel response values of red traffic light pixels and pixel response values of green traffic light pixels are substantially distributed outside of a predetermined range, where the pixel response values of red traffic light pixels are substantially distributed on a first side of the predetermined range and the pixel response values of green traffic light pixels are substantially distributed on a second side of the predetermined range which is opposite to the first side, each of the pixel response values being calculated based on multiplication of a first component and a second component of a corresponding pixel, the second component being calculated based on a summation of a sixth component and a seventh component which are respectively based on R and G values of the corresponding pixel, where the sixth and seventh components have a same sign;
    identifying, with the processor, pixels whose pixel response values are distributed on the first side or the second side as candidate pixels;
    identifying, with the processor, candidate blobs based on the candidate pixels; and
    verifying, with the processor, whether the candidate blobs are traffic lights,
    wherein the processor is configured to use a classifier to verify whether the candidate blobs are traffic lights, and
    wherein the classifier is a neural network, a support vector machine, or a cascade detector.

2. The method according to claim 1, wherein pixel response values of pixels other than red traffic light pixels and green traffic light pixels are substantially distributed within the predetermined range.

3. The method according to claim 1, wherein the first component indicates a tendency of the pixel response value, and the second component is able to amplify the tendency if the tendency is towards the first side or the second side.

4. The method according to claim 3, wherein the first component is calculated based on a summation of a third, a fourth, and a fifth component which are respectively based on R, G, and B values of the corresponding pixel, where the third component has a first sign, and the fourth and fifth components have a second sign which is opposite to the first sign.

5. The method according to claim 4, wherein the third component is k1*R, the fourth component is −k2*G, and the fifth component is −k3*B, where k1, k2, and k3 are set such that the tendency is substantially towards the first side if the corresponding pixel is a red traffic light pixel and the tendency is substantially towards the second side if the corresponding pixel is a green traffic light pixel.

6. The method according to claim 1, wherein the sixth component is k4*R and the seventh component is k5*G, where k4 and k5 are set such that the pixel response value is substantially on the first side if the corresponding pixel is a red traffic light pixel, and the pixel response value is substantially on the second side if the corresponding pixel is a green traffic light pixel.

7. The method according to claim 1, wherein identifying the candidate blobs based on the candidate pixels comprises:
identifying a first set of blobs based on the candidate pixels; and
identifying the candidate blobs from the first set of blobs by determining, for each blob of the first set of blobs, whether or not the blob is a member of the candidate blobs based on pixel response values of pixels of the blob and surrounding pixels of the blob.

8. A system for traffic light detection, comprising a processing device configured to use a classifier, wherein the classifier is a neural network, a support vector machine, or a cascade detector, the system configured to:
obtain, from a camera, a color image;
calculate pixel response values for pixels of the color image, respectively, where each of the pixel response values is calculated using R, G, and B values of a corresponding pixel directly, such that pixel response values of red traffic light pixels and pixel response values of green traffic light pixels are substantially distributed outside of a predetermined range, where the pixel response values of red traffic light pixels are substantially distributed on a first side of the predetermined range and pixel response values of green traffic light pixels are substantially distributed on a second side of the predetermined range which is opposite to the first side, each of the pixel response values being calculated based on multiplication of a first component and a second component of a corresponding pixel, the second component being calculated based on a summation of a sixth component and a seventh component which are respectively based on R and G values of the corresponding pixel, where the sixth and seventh components have a same sign;
identify pixels whose pixel response values are distributed on the first side or the second side as candidate pixels;
identify candidate blobs based on the candidate pixels; and
verify, with the classifier, whether the candidate blobs are traffic lights.

9. The system according to claim 8, wherein pixel response values of pixels other than red traffic light pixels and green traffic light pixels are substantially distributed within the predetermined range.

10. The system according to claim 8, wherein the first component indicates a tendency of the pixel response value, and the second component is able to amplify the tendency if the tendency is towards the first side or the second side.

11. The system according to claim 10, wherein the first component is calculated based on a summation of a third, a fourth, and a fifth component which are respectively based on R, G, and B values of the corresponding pixel, where the third component has a first sign, and the fourth and fifth components have a second sign which is opposite to the first sign.

12. The system according to claim 11, wherein the third component is k1*R, the fourth component is −k2*G, and the fifth component is −k3*B, where k1, k2, and k3 are set such that the tendency is substantially towards the first side if the corresponding pixel is a red traffic light pixel and the tendency is substantially towards the second side if the corresponding pixel is a green traffic light pixel.

13. The system according to claim 8, wherein the sixth component is k4*R and the seventh component is k5*G, where k4 and k5 are set such that the pixel response value is substantially on the first side if the corresponding pixel is a red traffic light pixel, and the pixel response value is substantially on the second side if the corresponding pixel is a green traffic light pixel.

14. The system according to claim 8, wherein the processing device is configured to identify the candidate blobs by:
identifying a first set of blobs based on the candidate pixels; and
identifying the candidate blobs from the first set of blobs by determining, for each blob of the first set of blobs, whether or not the blob is a member of the candidate blobs based on pixel response values of pixels of the blob and surrounding pixels of the blob.

15. A system for traffic light detection, comprising:
a processor configured to use a classifier, wherein the classifier is a neural network, a support vector machine, or a cascade detector; and
a non-transitory computer readable medium storing instructions executable by the processor to:
calculate pixel response values for pixels of a color image, respectively, where each of the pixel response values is calculated using R, G, and B values of a corresponding pixel directly, such that pixel response values of red traffic light pixels and pixel response values of green traffic light pixels are substantially distributed outside of a predetermined range, where the pixel response values of red traffic light pixels are substantially distributed on a first side of the predetermined range and pixel response values of green traffic light pixels are substantially distributed on a second side of the predetermined range which is opposite to the first side, each of the pixel response values being calculated based on multiplication of a first component and a second component of a corresponding pixel, the second component being calculated based on a summation of a sixth component and a seventh component which are respectively based on R and G values of the corresponding pixel, where the sixth and seventh components have a same sign;
identify pixels whose pixel response values are distributed on the first side or the second side as candidate pixels;
identify candidate blobs based on the candidate pixels; and
verify, using the classifier, whether the candidate blobs are traffic lights.

16. The system according to claim 15, wherein the color image is captured by a camera, the camera mounted on a vehicle.

17. The system according to claim 15, wherein verifying whether the candidate blobs are traffic lights includes identifying a set of blobs from the candidate blobs based on one or more geometric parameters of each blob of the set of blobs, the geometric parameters including a pixel number based on an image resolution, a height, a width, and a width to height ratio.

18. The system according to claim 17, wherein verifying whether the candidate blobs are traffic lights further comprises calculating a probability of each blob of the set of blobs based on a first pixel response value for pixels within an ego segment and a second pixel response value for pixels within an ambient segment, the ego segment enclosing each blob of the set of blobs and the ambient segment partially overlapping with the ego segment.

* * * * *